Patented Mar. 2, 1948

2,437,170

UNITED STATES PATENT OFFICE 2,437,170

DODECYLAMINE SALT OF 2-MERCAPTO-BENZOTHIAZOLE AND PROCESS FOR MAKING THE SAME

Arthur Minich, Westfield, N. J., assignor to Nuodex Products Co., Inc., Elizabeth, N. J., a corporation of New York No Drawing. Application July 14, 1945, Serial No. 605,187

2 Claims. (Cl. 260—306.6)

This invention is a toxicant comprising an amine derivative of a thiazole, more particularly the reaction product of 2-mercaptobenzothiazole ($C_6H_4N:C(SH)S$) and dodecylamine $$CH_3(CH_2)_{11}NH_2$$

which may be used, according to the present invention, either alone, in solution, or as an additive in various compositions or with an appropriate vehicle, to function as a fungicide, insecticide, mildewproofing agent, rotproofing agent, disinfectant, germicide, an anti-fouling ingredient of marine paints, and for analogous purposes. It has been found useful in the control, prevention or destruction of a wide variety of micro and macro organisms of plant and animal origin of harmful nature.

The composition of this invention is produced by reacting together 191 grams of 2-mercaptobenzothiazole with 209 grams of dodecylamine. These proportions are stoichiometrically correct but some minor variations from these proportions are feasible without seriously impairing the performance of the product.

The reaction is preferably carried out at an elevated temperature, 250° F. having been employed with satisfaction and, under these conditions, the salt forms rapidly as a homogeneous compound. The end product, which is in the form of a dry powder, may be subsequently dissolved in suitable solvents, such, e. g., as xylol, toluol, butyl alcohol, ethyl alcohol, diacetone alcohol, isophorone, etc., or may be added to suitable non-solvent vehicles, although the reaction may be carried on if desired in the presence of a solvent or vehicle or both.

In practice, water may be utilized as a dispersion vehicle and if an emulsion is desired an appropriate emulsifying agent, such as the petroleum sulfonates may be added to produce the same. Also the fungicide of this invention may be added to paraffin wax, aluminate stearate, chlorinated paraffins, etc., to impart its properties to the resulting composition.

The composition alone, diluted and in solution have each been employed successfully in the mildewproofing of cellulosic materials, more particularly cotton fabrics. For example, when it is deposited on fabric in a ratio of as low as 1% of compound per weight of cotton duck, the treated fabric will satisfactorily pass the standard mildewproofing tests although larger ratios may be used without departing from the invention. It is also practical for other exposure conditions to which the treated fabric may be subjected, to employ ratios below 1%.

Moreover, when as little as .5% of the composition per weight of leather, is employed, the treated leather becomes immune to attacks of mildew when subjected to conditions under which untreated leather will become completely overgrown with mildew. Promising results have also been obtained through the use of this composition in the mildewproofing of coatings, such as paints, enamels, lacquers, and the like, and as an insecticide and as the active ingredient of anti-fouling marine paints. In fact, the compound may be employed generally as a toxic for any of the uses hereinbefore indicated.

The foregoing detailed description sets forth the invention in its preferred practical form, but the invention is to be understood as fully commensurate with the appended claims.

Having thus fully described the invention, what I claim as new and desire to secure by Letters Patent is:

1. As a new composition of matter, a fungicidal and insecticidal oil-soluble dodecylamine salt of 2-mercaptobenzothiazole.

2. The herein described process of preparing a fungicidal and an insecticidal agent, which comprises: reacting together in stoichiometrical quantities 2-mercaptobenzothiazole and dodecylamine.

ARTHUR MINICH.

REFERENCES CITED

The following references are of record in the file of this patent:

UNITED STATES PATENTS

| Number | Name | Date |
|---|---|---|
| 2,024,605 | Sebrell | Dec. 17, 1935 |
| 2,027,184 | Lommel et al. | Jan. 7, 1936 |
| 2,358,402 | Kurlychek | Sept. 19, 1944 |

OTHER REFERENCES

Everitt, Jr. Washington Academy of Sciences, vol. 30, No. 3, pages 125–131 (1940).